United States Patent
Duelli et al.

(10) Patent No.: US 7,036,794 B2
(45) Date of Patent: May 2, 2006

(54) METHOD FOR CONTROL OF A VACUUM VALVE ARRANGED BETWEEN TWO VACUUM CHAMBERS

(75) Inventors: Bernhard Duelli, Uebersaxen (AU); Friedrich Geiser, Nuezideners (AU)

(73) Assignee: VAT Holding AG, Haag (CH)

( * ) Notice: Subject to any disclaimer, the term of this patent is extended or adjusted under 35 U.S.C. 154(b) by 35 days.

(21) Appl. No.: 10/917,641

(22) Filed: Aug. 13, 2004

(65) Prior Publication Data
US 2006/0033065 A1 Feb. 16, 2006

(51) Int. Cl.
*F16K 25/00* (2006.01)

(52) U.S. Cl. ............... 251/193; 251/175; 137/488

(58) Field of Classification Search ............ 251/172, 251/175, 193; 137/444
See application file for complete search history.

(56) References Cited

U.S. PATENT DOCUMENTS

| | | | |
|---|---|---|---|
| 4,052,036 A | 10/1977 | Schertler | |
| 4,470,576 A | 9/1984 | Schertler | |
| 4,634,094 A | 1/1987 | Geiser | |
| 4,809,950 A | 3/1989 | Geiser | |
| 4,921,213 A | 5/1990 | Geiser | |
| 5,577,707 A | 11/1996 | Brida | |
| 6,367,770 B1 | 4/2002 | Duelli | |
| 6,431,518 B1 | 8/2002 | Geiser | |
| 6,494,434 B1 | 12/2002 | Geiser | |
| 6,629,682 B1 | 10/2003 | Duelli | |
| 6,892,745 B1 * | 5/2005 | Benson | ............ 137/1 |

* cited by examiner

*Primary Examiner*—Edward K. Look
*Assistant Examiner*—John K. Fristoe, Jr.
(74) *Attorney, Agent, or Firm*—Reed Smith LLP

(57) ABSTRACT

A method for controlling a vacuum valve arranged between two vacuum chambers comprises a valve body with a valve opening, a closure member which closes the valve opening in a closed state of the vacuum valve and which releases the valve opening in an open state of the vacuum valve, wherein, for closing the valve opening by the closure member in the closed state of the vacuum valve, at least one flexible seal contacts a sealing surface of the vacuum valve, which sealing surface is acted upon by a pressing force in the closed state of the vacuum valve, an actuating device for opening and closing the vacuum valve with at least one actuator by which the seal is placed against the sealing surface for closing the vacuum valve, and with a control unit which controls this at least one actuator, pressure measurement values being supplied to this control unit as input signals from pressure sensors which detect the respective pressure in the two vacuum chambers, wherein a differential pressure between the two vacuum chambers is determined by the control unit and the magnitude of the pressing force acting on the seal in the closed state of the vacuum valve is controlled by the control unit depending on the determined differential pressure by controlling the at least one actuator.

13 Claims, 3 Drawing Sheets

METHOD FOR CONTROL OF A VACUUM VALVE ARRANGED BETWEEN TWO VACUUM CHAMBERS

BACKGROUND OF THE INVENTION a) Field of the Invention

The invention is directed to a method for controlling a vacuum valve arranged between two vacuum chambers. The vacuum valve comprises a valve body with a valve opening, a closure member which closes the valve opening in a closed state of the vacuum valve and which releases the valve opening in an open state of the vacuum valve, wherein, for closing the valve opening by the closure member in the closed state of the vacuum valve at least one flexible seal contacts a sealing surface of the vacuum valve, which sealing surface is acted upon by a pressing force in the closed state of the vacuum valve, and further comprises an actuating device for opening and closing the vacuum valve with at least one actuator by which the seal is placed against the sealing surface by means of a displacement of the closure member for closing the vacuum valve, and with a control unit which controls this at least one actuator, pressure measurement values being supplied to this control unit as input signals from pressure sensors which detect the respective pressure in the two vacuum chambers. The invention is further directed to a vacuum valve of the kind mentioned above.

b) Description of the Related Art

Vacuum valves are known in different embodiment forms. For example, U.S. Pat. No. 4,052,036 and U.S. Pat. No. 4,470,576 disclose slide valves in which the flexible seal arranged at the valve plate is placed against a sealing surface arranged at the valve body in the closed state by spreading a valve plate.

U.S. Pat. No. 4,809,950 discloses a slide valve in which a circumferentially closed seal 2 has portions which are arranged at end faces of the closure member and which lie in planes that are offset relative to one another in direction of the longitudinal axis of the valve opening and are connected to one another by connection portions. In a slide valve of this type, a multiple-step movement sequence with movement components in different directions is not required to prevent shearing forces acting on the seal when the closure member is closed. A similar slide valve with a linear displacement of the closure member between its opened position and its closing position is known from U.S. Pat. No. 4,921,213. In this case, connection portions between portions of the circumferentially closed seal that are arranged at the end faces of the closure member extend parallel to a plane formed by the longitudinal axis of the valve opening and by the closing direction.

Butterfly valves are known from U.S. Pat. No. 4,634,094 and U.S. Pat. No. 6,494,434 B1. In these butterfly valves, the plate-shaped closure member is swiveled between its open position and its closing position around an axis which lies perpendicular to the longitudinal axis of the valve opening. In its open position, the valve disk is arranged in the valve opening.

U.S. Pat. No. 6,431,518 B1, for example, describes an L-valve in which the closure member is initially moved from its open position into a position located opposite from the valve opening in which it is lifted from the valve seat and is consequently placed against the valve seat in a movement substantially in direction of the longitudinal axis of the valve opening.

U.S. Pat. No. 5,577,707 discloses a slide valve in which the closure member comprises a valve plate and a closing ring which is displaceably supported at the valve housing. In the closed state of the vacuum valve, the closing ring is placed against the valve plate and a sealing ring of the closing ring contacts a sealing surface of the valve plate.

In another type of plate valve, also known as a pendulum valve, there is no linear displacement of the closure member in the first stage of the movement of the plate-shaped closure member but, rather, a swiveling along a circular arc so that the closure member is moved into the position opposite the valve opening. The second stage of the closing movement of the closure member in the direction of the valve seat is effected in that the closure member, which is located opposite the valve seat but is initially still lifted from the valve seat, is displaced in direction of the longitudinal axis of the valve opening.

Another known type of plate valve is the corner valve. In these corner valves, a valve rod to which the plate-shaped closure member is fixed is guided out of the vacuum through a wall located opposite from the valve opening by means of a suitable guide-through. The passage forming the valve opening through the valve body has two portions extending at an angle to one another.

All of these types of vacuum valves can be constructed in such a way that they can be opened and closed manually. Further, the actuation device of a valve of this type for opening and closing the closure member can comprise at least one actuator which is controlled by a control unit. Pneumatic piston-cylinder units in particular are used as actuators for vacuum valves. However, actuators formed by electric motors or electromagnetic units are also known.

In vacuum valves that can be closed by means of actuators, the full closing force of the actuator usually acts on the closure member in the closed state in order to press the seal against the sealing surface and close the valve in a vacuum-tight manner. In the vacuum valve in U.S. Pat. No. 6,629,682 B2, a flexible supporting ring is arranged, in addition to the flexible seal, at the closure member in order to limit the pressing force acting on the seal in a vacuum valve in which the closure member is pressed against the valve seat more or less firmly depending on the differential pressure acting on this closure member. This is intended to reduce wear on the seal, which increases as stress increases. The problem of wear on the seal is aggravated by the use of aggressive process gases. It has been established that the flexible materials that are usually used for the seals are chemically corroded by aggressive process gases particularly when they are under high stress.

For purposes of reducing wear on the seal, it has already been suggested to provide an attitude control or position control of the closure member in order to position this closure member at a given closing position by means of the actuator, so that the deformation of the flexible material of the sealing ring is limited to a predetermined value independent from the existing differential pressure.

Further, U.S. Pat. No. 6,367,770 B1 discloses a slide valve with a wedge-shaped closure member having, at both of its inclined side surfaces, seals which contact sealing surfaces of a wedge-shaped valve seat in the closed state of the valve. In the closed state of the valve, the closure member is moved into the valve seat only in such a way that the seals are substantially not pressed. Pressing of a seal is not carried out until a differential pressure acts upon the closure member and presses the closure member against one of the two sealing surfaces.

OBJECT AND SUMMARY OF THE INVENTION

An important object of the invention is to provide a simplified method for controlling a vacuum valve of the type mentioned in the beginning by which wear on the flexible seal is reduced.

Another object of the invention is to provide a method for controlling a vacuum valve of the type mentioned in the beginning by which a good sealing of the valve opening is achieved in the closed state of the vacuum valve while reducing wear on the flexible seal.

This is achieved, according to the invention, by a method for controlling a vacuum valve arranged between two vacuum chambers comprising: a valve body with a valve opening, a closure member which closes the valve opening in a closed state of the vacuum valve and which releases the valve opening in an open state of the vacuum valve, wherein, for closing the valve opening by the closure member in the closed state of the vacuum valve at least one flexible seal contacts a sealing surface of the vacuum valve, which sealing surface is acted upon by a pressing force in the closed state of the vacuum valve, an actuating device for opening and closing the vacuum valve with at least one actuator by which the seal is placed against the sealing surface for closing the vacuum valve, and with a control unit which controls this at least one actuator, pressure measurement values being supplied to this control unit as input signals from pressure sensors which detect the respective pressure in the two vacuum chambers, wherein a differential pressure between the two vacuum chambers is determined by the control unit and the magnitude of the pressing force acting on the seal in the closed state of the vacuum valve is controlled by the control unit depending on the determined differential pressure by controlling the at least one actuator.

Accordingly, in a method according to the invention, the control of the actuator by which the seal is placed against the sealing surface for closing the vacuum valve is carried out depending on the differential pressure between the two vacuum chambers in order to carry out an adjustment of the magnitude of the pressing force acting on the seal. This is based on the idea that with a smaller differential pressure only a slight pressing force acting on the seal is required in order not to exceed a desired limiting value of the leakage rate of the vacuum valve. This desired limiting value of the leakage rate can be, e.g., a constant which is not dependent on the differential pressure prevailing at any given time. This constant can also vary in magnitude for different applications.

In an embodiment form of the invention, the actuator can permit a control of force, i.e., the closing force exerted by it is adjustable by the control unit. The pressing force acting on the seal in the closed state of the vacuum valve is controlled by adjusting the closing force of the actuator.

Depending upon the type of vacuum valve that is used, the pressing force acting on the flexible seal can either proceed exclusively from the closing force exerted by the actuator or can result from the superposition of the closing force exerted by the actuator on a force brought about by the differential pressure between the two vacuum chambers.

In another embodiment form of the invention, the actuator which places the seal against the sealing surface can permit a position control, i.e., the closing position of the closure member can be adjusted by the control unit. The pressing force acting on the seal in the closed state of the vacuum valve is controlled by adjusting the closing position of the closure member.

A vacuum valve arranged, according to the invention, between two vacuum chambers comprises a valve body with a valve opening, a closure member which closes the valve opening in a closed state of the vacuum valve and which releases the valve opening in an open state of the vacuum valve, wherein, for closing the valve opening by the closure member in the closed state of the vacuum valve at least one flexible seal contacts a sealing surface of the vacuum valve, which sealing surface is acted upon by a pressing force in the closed state of the vacuum valve, and further comprises an actuating device for opening and closing the vacuum valve with at least one actuator by which the seal is placed against the sealing surface for closing the vacuum valve, and with a control unit which controls this at least one actuator, pressure measurement values being supplied to this control unit as input signals from pressure sensors which detect the respective pressure in the two vacuum chambers, wherein a differential pressure between the two vacuum chambers is determined by the control unit and the magnitude of the pressing force acting on the seal in the closed state of the vacuum valve is controlled by the control unit depending on the determined differential pressure by controlling the at least one actuator.

Further advantages and details of the invention will be described in the following with reference to the embodiment examples shown in the drawings, further objects of the invention following therefrom.

BRIEF DESCRIPTION OF THE DRAWINGS

The vacuum valve which is shown schematically in FIGS. 1 and 2 and which is arranged between vacuum chambers 16, 17, each having a connection flange for this purpose, comprises a valve body 1 with a valve opening 2 which has a longitudinal axis 3. A closure member 4 serves to close the valve opening in the closed state of the vacuum valve. FIGS. 1 and 2 show the opened state of the vacuum valve in which the closure member 4 releases the valve opening 2.

Figure 1:
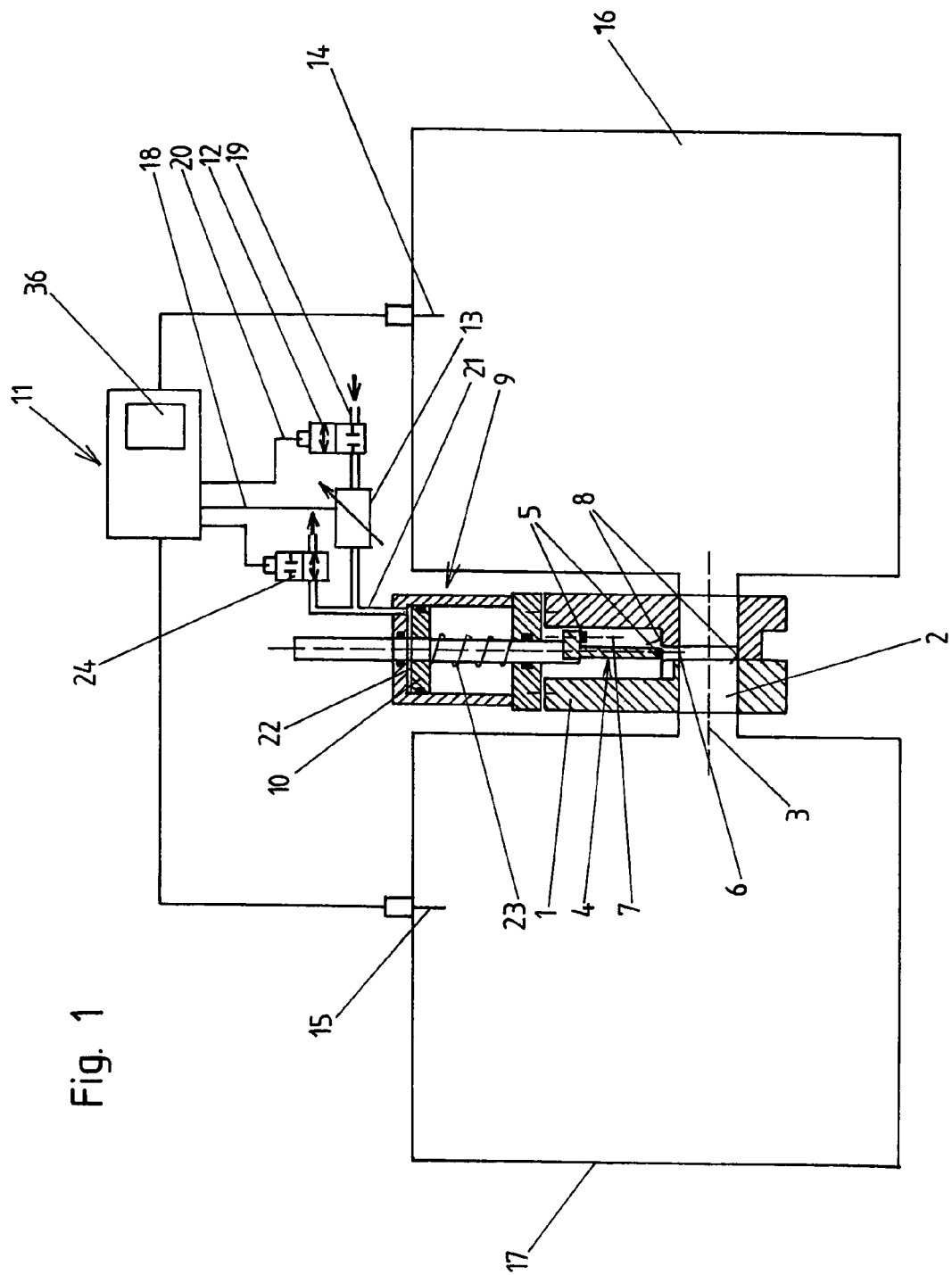
FIG. 1 is a schematic view of a vacuum valve arranged between two vacuum chambers in a schematic section in axial direction of the axis of the valve opening.

A flexible seal 5 which is formed in a circumferentially closed manner is arranged at the closure member 4 and extends over the face of the closure member. The seal 5 arranged at the valve seat has portions which lie in two parallel planes 6, 7 at a distance from one another in the direction of the longitudinal axis 3 of the valve opening 2 and which are joined along connection portions.

In the closed state of the vacuum valve, the seal 5 contacts a sealing surface 8 of the valve body 1. An actuator 9 in the form of a piston-cylinder unit is provided for moving the closure member 4 out of its open position, shown in FIGS. 1 and 2, into its closing position in which the seal 5 contacts the sealing surface 8. The piston 10 can be actuated pneumatically.

A vacuum valve of the type mentioned above is known and described, for example, in U.S. Pat. No. 4,809,950. The disclosure of this U.S. Patent is hereby incorporated herein by reference. Various modifications, some of which are shown and described in U.S. Pat. No. 4,809,950, are conceivable and possible for the construction of this type of vacuum valve, e.g., with respect to the closure member 4 and the shape of the seal 5 and sealing surface 8.

The actuating device for opening and closing the vacuum valve comprises, in addition to the actuator 9 formed by the piston-cylinder unit, a control unit 11 that controls the actuator 9 by means of a shutoff valve 12, a pressure regulating valve 13 and a vent valve 24. Pressure measurement values are supplied to the control unit 11 as input signals by the pressure sensors 14, 15. The respective pressure prevailing in the two vacuum chambers 16, 17 between which the vacuum valve is arranged is detected by these pressure sensors 14, 15. This control unit 11 has an input device 36 and possibly a display device to operate the control unit 11.

The vacuum chambers 16, 17 between which the vacuum valve is arranged are shown only in a highly schematic manner in FIG. 1. They can be process chambers, e.g., for the semiconductor industry. Different production processes can be carried out in the vacuum chamber 16 and/or in the vacuum chamber 17. Process gases can also be introduced via supply lines, not shown. The pressure of process gases of the kind mentioned above is usually below atmospheric pressure. Lock devices, not shown in FIG. 1, are usually used to introduce substrates on which the processes are to be carried out into the vacuum chamber 16 and/or vacuum chamber 17.

The control of the vacuum valve is carried out in such a way that a differential pressure between the two vacuum chambers 16, 17 is determined by the control unit 11. For this purpose, the pressure value measured by one pressure sensor 14, 15 is subtracted from the pressure value measured by the other pressure sensor 14, 15. Subsequently, either only the amount or both the amount and the mathematical sign of this determined differential pressure is/are used. In the following, it is assumed first that only the amount of the differential pressure is used.

Figure 2:
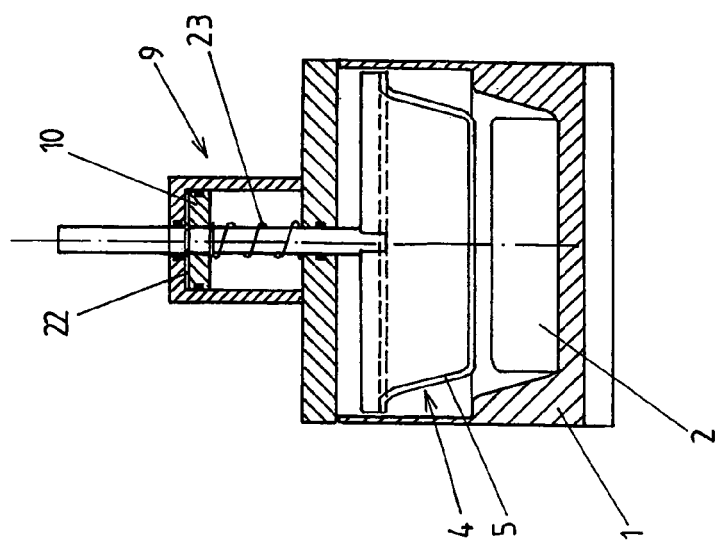
FIG. 2 shows a schematic section of the vacuum valve of FIG. 1 in direction transverse to the axis of the valve opening.

In the embodiment form shown in FIGS. 1 and 2, the closing force that is exerted by the actuator 9 on the closure member 4 can be adjusted by the control unit 11. The pressure regulating valve 13 is provided for this purpose and can be controlled by the control unit 11 via the control line 18. A compressed-air supply line is connected to the connection 19. In order to close the vacuum valve, the shutoff valve 12 is adjusted to the opened state by the control unit 11 via the control line 20 and the vent valve 24 is moved to the closed state by the control unit 11. The pressure of the air flowing through the compressed-air line 21 into the piston space 22 of the actuator 9 and therefore the closing force exerted by the piston-cylinder unit can be adjusted by the pressure regulating valve 13. The adjustment of this closing force by the control unit 11 is carried out, according to the invention, as a function of the determined amount of the differential pressure between the two vacuum chambers 16, 17. The greater this differential pressure, the greater the closing force that is adjusted. When the differential pressure is equal to zero, the closing force is adjusted to a minimum value.

In this embodiment example of the invention, the pressing force which acts on the seal 5 and by means of which the latter is pressed against the sealing surface 8 is caused substantially only by the closing force exerted by the actuator 9. The pressing force by which the seal 5 is pressed against the sealing surface 8 may also be referred to as "sealing force". Since the pressing force on the seal 5 by which this seal 5 is pressed against the sealing surface 8 is increased as the differential pressure increases, the leakage rate of the vacuum valve can remain substantially constant for different differential pressures, for example (however, with a constant pressing force on the seal 5, the leakage rate would increase as the differential pressure increases). In this way, when a maximum permissible leakage rate is set for the vacuum valve, this predetermined leakage rate can be maintained at low differential pressures between the two vacuum chambers 16, 17 by means of a relatively low pressing force acting on the seal 5. Since wear on the seal 5 depends upon the stress acting upon it, i.e., upon the pressing force acting upon it, the seal 5 can be spared in this way at lower differential pressures between the two vacuum chambers 16, 17 compared to a conventional control of the vacuum valve in which the pressing force acting on the seal 5 is as high at low differential pressures as it is at high differential pressures between the two vacuum chambers 16, 17.

In the embodiment example according to FIGS. 1 and 2, the opening of the vacuum valve is carried out by means of the spring 23 when the shutoff valve 12 is closed again by the control unit 11 and the vent valve 24 is opened by the control unit 11. Instead of this, a piston 10 which can be acted upon by compressed air on both sides could also be provided as is known and conventional.

In the following, a modified embodiment form of the invention is described with reference to the schematic drawing in FIG. 3. The closure member 4 with the seal 5 and the sealing surface 8 of the valve body 1 are constructed like the valve shown in FIGS. 1 and 2. In this case, an electric motor is provided as actuator 25 for adjusting the closure member 4 between its open position and its closing position. This electric motor is constructed, for example, as an AC servomotor. The electric motor controlled by the control unit 11 is connected by a drive shaft to a pinion 26 which meshes with the toothed rack 27 at which the closure member 4 is arranged. A sensor 28 whose output signals are detected by the control unit 11 is provided for detecting the position of the toothed rack 27 and, therefore, the position of the closure member 4. In this way, the position of the closure member 4 can be controlled. The differential pressure between the two vacuum chambers 16, 17 is again determined by the control unit 11 through evaluation of the pressure values measured by the pressure sensors 14, 15. Depending on the detected differential pressure, the closing position of the closure member 4 is controlled by a corresponding control of the actuator 25 by the control unit 11. The pressing force acting upon the seal 5 in the closing position varies depending on the adjustment of the closing position of the closure member 4. As was already mentioned, this pressing force acting upon the seal in its closing position can also be called "sealing force". The closer the closure member 4 is arranged to the sealing surface 8, or to the valve seat having the sealing surface 8, in the closing position, the greater the pressing force acting on the seal 5. Again, the greater the amount of differential pressure, the higher the value at which the pressing force 5 is adjusted. When the differential pressure is equal to zero, the pressing force is adjusted to a minimum value.

A stepper motor, for example, could also be used for the actuator 25 instead of an AC servo motor.

The pressing force acting on the seal 5 that is to be adjusted for a respective value of the differential pressure can be stored in the form of a table or in the form of a function in the control unit 11. This pressing force is adjusted by controlling the closing force of the actuator 9 in the embodiment example according to FIGS. 1 and 2 and is adjusted by controlling the closing position of the closure member 4 by means of the actuator 25 in the embodiment example according to FIG. 3.

When the closing force acting on the closure member is adjusted by means of the actuator as was explained with reference to FIGS. 1 and 2, it depends upon the construction of the vacuum valve whether or not the pressing force acting upon the seal of the vacuum valve is dependent upon the differential pressure at a determined closing force exerted by the actuator. When the valve is constructed as shown schematically in FIGS. 1 and 2, this is substantially not the case. In slide valves such as those known, for example, from U.S. Pat. Nos. 4,052,036 and 4,470,576, the pressing force acting upon the seal is increased or reduced depending upon the magnitude and the direction (the mathematical sign) of the differential pressure existing between the two vacuum chambers when the closing force by which the closure member is pressed against the valve seat is constant. The method according to the invention can also be used in connection with valves of the type mentioned above when actuators that are controllable and adjustable by a control unit are used for opening and closing the vacuum valve. The disclosure of U.S. Pat. Nos. 4,052,036 and 4,470,576 is hereby incorporated herein by reference. In order to adjust the pressing force acting upon the seal as a function of the differential pressure to a desired magnitude in slide valves constructed in this way, the closing force of the actuator can be controlled depending upon the amount of differential pressure and also depending upon the mathematical sign of the differential pressure.

The same is true when the vacuum valve is constructed as a butterfly valve as is known, for example, from U.S. Pat. Nos. 4,634,94 and 6,494,434 B1 or when the vacuum valve is constructed as an L-valve as is known, for example, from U.S. Pat. No. 6,431,518 B1 or the closure member has a closing ring which is displaceably mounted at the valve body and actuated by actuators as is known from U.S. Pat. No. 5,577,707. The disclosure of these U.S. patents is likewise incorporated herein by reference.

The control of a respective actuator controlling the closure member can be carried out, for example, in such a way that when a mathematical sign of the differential pressure corresponds to a differential pressure acting in the direction in which the differential pressure increases the pressing of the seal as it increases in magnitude the closing force of the closure member is maintained constant. However, when the differential pressure has the opposite sign, the closing force is increased as the differential pressure increases, namely in such a way that the resulting pressing force acting on the seal increases as the differential pressure increases.

Figure 4:
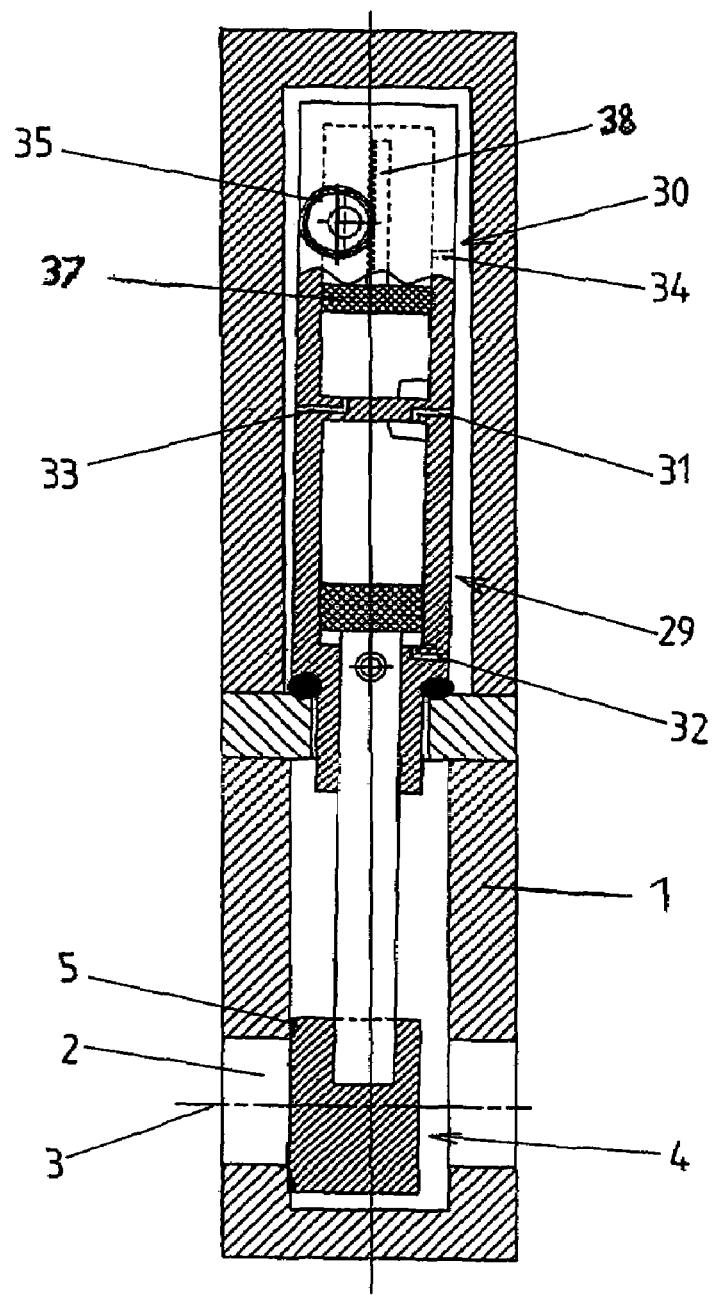
FIG. 4 shows a schematic view of another possible embodiment form of the vacuum valve.

As an example of a vacuum valve controlled in this way, FIG. 4 shows an L-valve such as that whose basic construction is known from U.S. Pat. No. 6,431,518 B1. The vacuum chambers with the pressure sensors and the control unit with the associated control members (e.g., shutoff valves and pressure regulating valves) are shown in the Figure. The closure member is adjusted between its open position and its position located opposite from the sealing surface by means of the actuator 29 which is formed as a piston-cylinder unit, for which purpose compressed air is applied to and released from the compressed-air lines 31, 32 in a corresponding manner. The closure member 4 is pressed against the valve seat having the sealing surface by means of the actuator 30, which is likewise formed as a piston-cylinder unit, for which purpose compressed air is applied to and released from the compressed-air lines 33, 34 in order to move the piston 37. The seal 5 is pressed against the sealing surface arranged at the valve body 1 by the eccentrically mounted toothed wheel 35 which cooperates with the toothed rack 38 arranged at the piston 37. The closing force exerted by the actuator 30 is adjustable by means of the control unit 11 by adjusting the pressure of the compressed air supplied through the compressed-air line 33.

Figure 3:
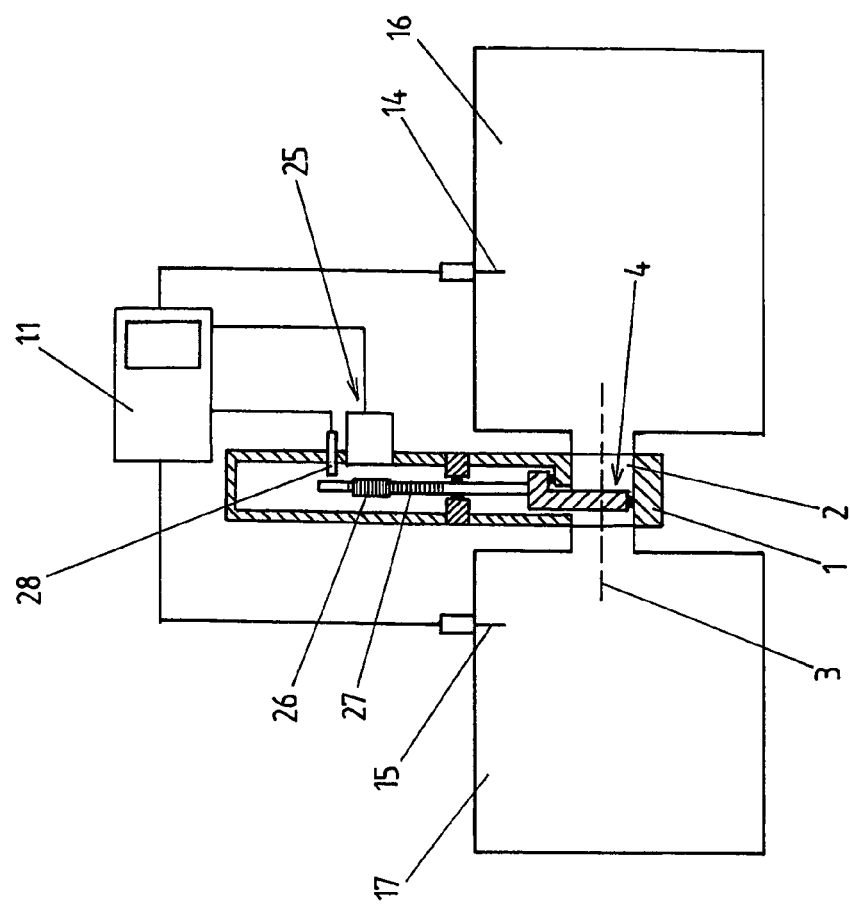
FIG. 3 shows a schematic view of another embodiment example of the invention.

Instead of an actuator whose closing force is adjustable, actuators in which the closing position is adjustable, as was described by way of example with reference to FIG. 3, could also be used for all of the valves mentioned above. When the closing position is regulated in this case (with a return of the actual value of the closing position), the pressing of the seal results directly from the adjusted closing position and is substantially independent from the differential pressure.

A desired curve of the pressing force acting on the seal as a function of the differential pressure existing between the two chambers can be achieved by means of the invention. As was stated, this can be achieved in valves in which an existing differential pressure does not act on the closure member in such a way that it increases or decreases the pressing of the seal as well as in valves where it does so act.

In order to adjust the pressing force acting on the seal as a function of the differential pressure in the desired manner, the invention can also be used in conjunction with a vacuum valve in which the closure member is V-shaped and has seals on both sides which contact corresponding diametrically opposed sealing surfaces such as is known from U.S. Pat. No. 6,367,770 B1 whose disclosure is hereby incorporated herein by reference.

It is also conceivable and possible to use the invention in connection with other vacuum valves, for example, with a construction such as that known from U.S. Pat. No. 4,921,213 whose disclosure is likewise incorporated herein by reference.

Instead of the constructions of the actuators shown herein, other actuators could also be provided for controlling the closure member, for example, electromagnetic actuators.

In the embodiment examples shown herein, the seal is arranged at the closure member and the sealing surface is arranged at the valve body. It would also be conceivable and possible to arrange the sealing surface at the closure member and the seal at the valve body.

The control of the actuator by the control unit can be constructed as an open control as is shown by way of example in FIGS. 1 and 2 and as a closed control loop as is shown by way of example in FIG. 3.

While the preceding description and drawings show the invention, it is obvious to the person skilled in the art that various modifications can be carried out without departing from the spirit of and field of the invention. The field of the invention is not limited to the embodiment examples shown herein, but rather should be defined with reference to the appended claims together with their full range of possible equivalents.

| Reference Numbers: | |
| --- | --- |
| 1 | valve body |
| 2 | valve opening |
| 3 | longitudinal axis |
| 4 | closure member |
| 5 | seal |
| 6 | plane |
| 7 | plane |
| 8 | sealing surface |
| 9 | actuator |
| 10 | piston |

-continued

| Reference Numbers: | |
|---|---|
| 11 | control unit |
| 12 | shutoff valve |
| 13 | pressure regulating valve |
| 14 | pressure sensor |
| 15 | pressure sensor |
| 16 | vacuum chamber |
| 17 | vacuum chamber |
| 18 | control line |
| 19 | connection |
| 20 | control line |
| 21 | compressed-air line |
| 22 | piston space |
| 23 | spring |
| 24 | vent valve |
| 25 | actuator |
| 26 | pinion |
| 27 | toothed rack |
| 28 | sensor |
| 29 | actuator |
| 30 | actuator |
| 31 | compressed-air line |
| 32 | compressed-air line |
| 33 | compressed-air line |
| 34 | compressed-air line |
| 35 | toothed wheel |
| 36 | input device |
| 37 | piston |
| 38 | toothed rack |

What is claimed is:

1. A method for controlling a vacuum valve arranged between two vacuum chambers which vacuum valve comprises:
    a valve body with a valve opening;
    a closure member which closes the valve opening in a closed state of the vacuum valve and which releases the valve opening in an open state of the vacuum valve;
    wherein, for closing the valve opening by the closure member in the closed state of the vacuum valve, at least one flexible seal contacts a sealing surface of the vacuum valve, which seal is acted upon by a pressing force in the closed state of the vacuum valve;
    an actuating device for opening and closing the vacuum valve with at least one actuator by which seal is placed against the sealing surface for closing the vacuum valve; and
    a control unit which controls this at least one actuator, pressure measurement values being supplied to this control unit as input signals from pressure sensors which detect the respective pressure in the two vacuum chambers;
    the method comprises the steps of:
    determining a differential pressure between the two vacuums by the control unit;
    controlling the magnitude of the pressing force acting on the seal in the closed state of the vacuum valve by controlling the at least one actuator by the control unit;
    wherein the magnitude of the pressing force is controlled in dependence of the determined differential pressure between the two vacuum chambers.

2. The method according to claim 1, wherein a closing force which is adjustable by the control unit can be exerted on the closure member in the closed state of the vacuum valve by the at least one actuator and the magnitude of the pressing force acting on the seal in the closed state of the vacuum valve is controlled by adjusting this closing force.

3. The method according to claim 2, wherein the closing force of the at least one actuator is increased when the amount of the differential pressure increases.

4. The method according to claim 2, wherein the closing force of the at least one actuator is increased as the amount of the differential pressure increases only when the differential pressure acts in a direction in which it reduces the pressing force acting on the seal.

5. The method according to claim 2, wherein the closing force to be adjusted for a respective value of the differential pressure is stored in a table or in the form of a function in the control unit.

6. The method according to claim 1, wherein the closure member can be positioned in the closed state of the vacuum valve by the at least one actuator in a closing position that is adjustable by the control unit, and the magnitude of the pressing force acting on the seal in the closed state of the vacuum valve is controlled by adjusting this closing position.

7. The method according to claim 6, wherein the distance between the closure member and a valve seat of the vacuum valve in the closing position of the closure member is reduced as the amount of differential pressure increases.

8. The method according to claim 6, wherein the closing position to be adjusted for a respective value of the differential pressure is stored in a table or in the form of a function in the control unit (11).

9. The method according to claim 1, wherein the pressing force acting on the seal in the closed state of the vacuum valve is controlled in such a way that it increases as the amount of differential pressure increases.

10. The method according to claim 9, wherein the pressing force acting on the seal in the closed state of the vacuum valve is adjusted to a minimum value at a differential pressure that is equal to zero.

11. A vacuum valve which is arranged between two vacuum chambers and which vacuum valve comprises:
    a valve body with a valve opening;
    a closure member which closes the valve opening in a closed state of the vacuum valve and which releases the valve opening in an open state of the vacuum valve;
    wherein, for closing the valve opening by the closure member in the closed state of the vacuum valve at least one flexible seal contacts a sealing surface of the vacuum valve, which seal is acted upon by a pressing force in the closed state of the vacuum valve;
    an actuating device for opening and closing the vacuum valve with at least one actuator by which seal is placed against the sealing surface for closing the vacuum valve; and
    a control unit which controls this at least one actuator and to which pressure measurement values are supplied as input signals from pressure sensors which detect the respective pressure in the two vacuum chambers;
    wherein a differential pressure between the two chambers is determined by the control unit and the magnitude of the pressing force acting on the seal in the closed state of the vacuum valve is controlled by the control unit depending on the determined differential pressure by controlling the at least one actuator.

12. The vacuum valve according to claim 11, wherein a closing force which is adjustable by the control unit can be exerted on the closure member in the closed state of the vacuum valve by at least one actuator and the magnitude of the pressing force acting upon the seal in the closed state of the vacuum valve is controlled by adjusting this closing force.

13. The vacuum valve according to claim 11, wherein the closure member can be positioned in a closing position which is adjustable by the control unit in the closed state of the vacuum valve by at least one actuator and the magnitude of the pressing force acting on the seal in the closed state of the vacuum valve is controlled by adjusting this closing.

* * * * *